US008660740B2

(12) United States Patent
Koniditsiotis et al.

(10) Patent No.: US 8,660,740 B2
(45) Date of Patent: Feb. 25, 2014

(54) SYSTEM FOR MONITORING VEHICLE USE

(75) Inventors: Chris Koniditsiotis, Melbourne (AU); Brian Edwards, Hobart (AU); Graham Taylor, Spring Hill (AU); Greg Lippiatt, Epping (AU)

(73) Assignee: Transport Certification Australia Ltd., Melbourne, Victoria (AU)

( * ) Notice: Subject to any disclaimer, the term of this patent is extended or adjusted under 35 U.S.C. 154(b) by 561 days.

(21) Appl. No.: 12/745,227

(22) PCT Filed: Nov. 27, 2008

(86) PCT No.: PCT/AU2008/001749

§ 371 (c)(1),
(2), (4) Date: Oct. 27, 2010

(87) PCT Pub. No.: WO2009/067742

PCT Pub. Date: Jun. 4, 2009

(65) Prior Publication Data

US 2011/0035139 A1 Feb. 10, 2011

(30) Foreign Application Priority Data

Nov. 30, 2007 (AU) ................................ 2007237287
Nov. 30, 2007 (NZ) ........................................ 563929

(51) Int. Cl.
*G01M 17/00* (2006.01)
*G06F 19/00* (2011.01)
*G06F 7/00* (2006.01)

(52) U.S. Cl.
USPC ....... 701/33.4; 701/31.4; 701/32.3; 701/33.6; 701/517; 340/438; 177/136

(58) Field of Classification Search
USPC ........ 701/33.6, 33.4, 36, 430, 400, 517, 31.4; 340/5.1–5.2, 405, 438, 539.13, 531, 340/540, 439, 988, 993; 177/136
See application file for complete search history.

(56) References Cited

U.S. PATENT DOCUMENTS 5,046,007 A * 9/1991 McCrery et al. ............. 701/29.6
5,452,446 A * 9/1995 Johnson ....................... 701/33.4

(Continued)

FOREIGN PATENT DOCUMENTS

CA 2661569 A1 * 10/2009
GB 2407192 4/2005

(Continued)

OTHER PUBLICATIONS

Certification and audit of the Intelligent Access Program for the monitoring of heavy vehicles in Australia; Ma, J.C.; Karl, C.A.; Dyukov, A.; Intelligent Vehicles Symposium, 2009 IEEE; Transportation; Digital Object Identifier: 10.1109/IVS.2009.5164365 Publication Year: 2009 , pp. 718-721.*

(Continued)

*Primary Examiner* — Cuong H Nguyen
(74) *Attorney, Agent, or Firm* — Blakely, Sokoloff, Taylor & Zafman

(57) ABSTRACT

A system for monitoring of vehicles and particularly heavy vehicles and their compliance with specific network (e.g. road) access conditions uses vehicle telematics solutions. The system includes an in-vehicle unit (IVU) associated with a vehicle being monitored. The IVU includes a receiver for receiving positioning signals, a processor for processing a time-marked log of vehicle data, a storage element for storing the time-marked log and a first wireless communication element for communicating time marked data to a Service Provider (SP) processing apparatus. One or more Service Providers operate Service Provider (SP) processing apparatus. The SP processing apparatus include a SP wireless communication element for receiving time-marked data from one or more IVUs and a SP processor for processing received data. The SP processor is adapted to compare received data from the time-marked log of a vehicle with one or more vehicle-use conditions applicable to that vehicle, and to generate a non-compliance report where the comparison indicates that non-compliant activity has occurred. A SP storage element stores non-compliance reports and relevant time-marked data.

21 Claims, 9 Drawing Sheets

(56) References Cited

U.S. PATENT DOCUMENTS

| | | | | |
|---|---|---|---|---|
| 5,541,858 | A * | 7/1996 | Warner | 702/165 |
| 5,751,245 | A * | 5/1998 | Janky et al. | 342/357.4 |
| 6,115,655 | A * | 9/2000 | Keith et al. | 701/467 |
| 6,198,996 | B1 | 3/2001 | Berstis | |
| 6,253,129 | B1 * | 6/2001 | Jenkins et al. | 701/32.3 |
| 6,393,346 | B1 * | 5/2002 | Keith et al. | 701/521 |
| 6,459,367 | B1 * | 10/2002 | Green et al. | 340/440 |
| 6,526,341 | B1 * | 2/2003 | Bird et al. | 701/31.4 |
| 6,647,328 | B2 * | 11/2003 | Walker | 701/36 |
| 6,892,131 | B2 * | 5/2005 | Coffee et al. | 701/482 |
| 7,117,075 | B1 * | 10/2006 | Larschan et al. | 701/29.6 |
| 7,783,507 | B2 * | 8/2010 | Schick et al. | 705/7.11 |
| 7,805,382 | B2 * | 9/2010 | Rosen et al. | 705/321 |
| 8,139,820 | B2 * | 3/2012 | Plante et al. | 382/104 |
| 2001/0018628 | A1 * | 8/2001 | Jenkins et al. | 701/35 |
| 2002/0186144 | A1 * | 12/2002 | Meunier | 340/825.28 |
| 2004/0049324 | A1 * | 3/2004 | Walker | 701/1 |
| 2004/0181495 | A1 | 9/2004 | Grush | |
| 2005/0203683 | A1 | 9/2005 | Olsen | |
| 2006/0004589 | A1 | 1/2006 | Ross et al. | |
| 2007/0038338 | A1 * | 2/2007 | Larschan et al. | 701/2 |
| 2007/0038351 | A1 * | 2/2007 | Larschan et al. | 701/35 |
| 2007/0038352 | A1 * | 2/2007 | Larschan et al. | 701/35 |
| 2007/0038353 | A1 * | 2/2007 | Larschan et al. | 701/35 |
| 2007/0050108 | A1 * | 3/2007 | Larschan et al. | 701/35 |
| 2008/0091309 | A1 * | 4/2008 | Walker | 701/1 |
| 2009/0254241 | A1 * | 10/2009 | Basir | 701/33 |

FOREIGN PATENT DOCUMENTS

| | | |
|---|---|---|
| WO | WO 2006/015425 | 2/2005 |
| WO | WO 2005/069203 | 7/2005 |

OTHER PUBLICATIONS

Field testing and monitoring of rolling stock under the new federal track and equipment regulations; Lombardi, E.J.; Sherrock, E.; Warner, D.C.; Whitten, B.T; Railroad Conference, 2002 ASME/IEEE Joint; Digital Object Identifier: 10.1109/RRCON.2002.1000108 Publication Year: 2002 , pp. 161-169.*

Remote ride quality monitoring of Acela train set performance; Ackroyd, P.; Angelo, S.; Stevens, J.; Railroad Conference, 2002 ASME/IEEE Joint; Digital Object Identifier: 10.1109/RRCON.2002.1000109; Publication Year: 2002 , pp. 171-178.*

HERO: Online Real-Time Vehicle Tracking; Hongzi Zhu ; Minglu Li ; Yanmin Zhu ; Ni, L.M.; Parallel and Distributed Systems, IEEE Transactions on; vol. 20 , Issue: 5; Digital Object Identifier: 10.1109/TPDS.2008.147; Publication Year: 2009 , pp. 740-752.*

Automatic vehicle identification on busy multi-lane city roads; Do, M.A. ; Ong, J.T. ; Chang, C.H. ; Ooi, T.H. ; Mital, D.; Vehicle Navigation and Information Systems Conference, 1991; vol. 2; Digital Object Identifier: 10.1109/VNIS.1991.205844 Publication Year: 1991 , pp. 989-997.*

An Approach to using Honeypots in In-Vehicle Networks; Verendel, V. ; Nilsson, D.K. ; Larson, U.E. ; Jonsson, E.; Vehicular Technology Conference, 2008. VTC 2008—Fall. IEEE 68th; Digital Object Identifier: 10.1109/VETECF.2008.260 Publication Year: 2008 , pp. 1-5.*

Streaming-Viability Analysis and Packet Scheduling for Video Over In-Vehicle Wireless Networks; Qiong Li ; Andreopoulos, Y. ; van der Schaar, M.; Vehicular Technology, IEEE Transactions on; vol. 56 , Issue: 6 , Part: 1; Digital Object Identifier: 10.1109/TVT.2007.901927; Publication Year: 2007 , pp. 3533-3549.*

An unified vehicle supervising and traffic information system; Shin-Iuan Wang ; Chia-Chi Huang; Personal, Indoor and Mobile Radio Communications, 1996. PIMRC'96., Seventh IEEE International Symposium on; vol. 3; Digital Object Identifier: 10.1109/PIMRC.1996.568425; Publication Year: 1996 , pp. 968-972 vol. 3.*

Hampton roads traffic surveillance and control system; Schesser, J. ; Tanner, D.N.; Vehicular Technology, IEEE Transactions on vol. 29 , Issue: 2; Digital Object Identifier: 10.1109/T-VT.1980.23834; Publication Year: 1980 , pp. 137-149 IEEE Journals & Magazines.*

Admission control for roadside unit access in Intelligent Transportation Systems; Bo Yu ; Cheng-Zhong Xu; Quality of Service, 2009. IWQoS. 17th International Workshop on; Digital Object Identifier: 10.1109/IWQoS.2009.5201409; Publication Year: 2009 , pp. 1-9.*

* cited by examiner

| Vehicle Category | Number of Axles |
|---|---|
| Rigid Truck | 3 |
| Rigid Truck | 4 |
| Prime Mover | N/A |
| Semi Trailer | 4 |
| Semi Trailer | 5 |
| Semi Trailer | 6 |
| Semi Trailer | 7 |
| Semi Trailer (Quad Axle Trailer) | 7 |
| Semi Trailer | 8 |
| B Double | 4 |
| B Double | 5 |
| B Double | 6 |
| B Double | 7 |
| B Double | 8 |
| B Double | 9 |
| B Double | 10 |
| B Double (Quad Axle Trailer) | 10 |
| B Double (Quad Axle Trailer) | 11 |
| B Triple | 7 |
| B Triple | 8 |
| B Triple | 9 |
| B Triple | 10 |
| B Triple | 11 |
| B Triple | 12 |
| B Triple | 13 |
| B Triple | 14 |
| AB Triple | 10 |
| AB Triple | 11 |
| AB Triple | 12 |
| AB Triple | 13 |
| AB Triple | 14 |
| AB Triple | 15 |
| AB Triple | 16 |

FIG. 9

| | |
|---|---|
| Road Train Double | 9 |
| Road Train Double | 10 |
| Road Train Double | 11 |
| Road Train Double | 12 |
| Road Train Triple | 12 |
| Road Train Triple | 13 |
| Road Train Triple | 14 |
| Road Train Triple | 15 |
| Road Train Triple | 16 |
| Road Train Triple | 17 |
| Road Train Triple | 18 |
| Road Train Triple | 19 |

FIG. 9 (cont)

| Alarm Code | Alarm Description (to assist interpretation only: requirement details are found at the appropriate Reference) | Reference | Alarm Record Type |
|---|---|---|---|
| 1 | External power supply disconnected from IVU | A.23.1a | |
| 2 | External power supply reconnected to IVU | A.23.1b | |
| 3 | External power supply disconnected from IVU - Vehicle movement indicated by ignition | A.23.1c | 1 |
| 4 | External power supply disconnected from IVU - Vehicle movement detected by other independent movement sensor | A.23.1d | 1 |
| 5 | Ignition disconnected | A.23.1e | 1 |
| 6 | Ignition reconnected | A.23.1f | 1 |
| 7 | Other independent movement sensor disconnected | A.23.1g | 1 |
| 8 | Other independent movement sensor reconnected | A.23.1h | 1 |
| 9 | Unauthorised access to data in IVU detected | A.23.1i | 1 |
| 10 | Unauthorised access to IVU software detected | A.23.1j | 1 |
| 11 | GPS antenna disconnected from IVU | A.23.1k | 1 |
| 12 | GPS antenna reconnected to IVU | A.23.1l | 1 |
| 51 | No Vehicle Type and TCM data self declared, when required, where at least one SD (Vehicle Type/TCM) Condition is applicable | B.17.16 | 2A |
| 52 | Position, Alarm & SD Records are not numbered consecutively | B.17.3a | 2A |
| 53 | Speed Records are not numbered consecutively | B.17.3b | 2A |
| 54 | IVU Data Record numbering does not increase chronologically | B.17.4 | 2A |
| 55 | After a period of non-operation, the distance between the Position Record before and the Position Record after that period exceeds 500 metres | B.17.11 | 2A |
| 56 | Zero satellites used for a continuous period of operation of at least five minutes while the vehicle was moving | B.17.8 | 2A |
| 57 | After a period where zero satellites were used for a continuous period of operation of at least five minutes, the distance between the Position Record before and the Position Record after the cessation of signal, exceeds 500 metres | B.17.10 | 2A |
| 58 | Less than four satellites used for a continuous period of operation of at least 20 minutes, while the vehicle was moving | B.17.12 | 2A |
| 59 | Less than four satellites used in more than 20% of a sequence of 10,000 Position Records | B.17.14 | 2A |
| 80 | No Data Blocks have been received within a 72 hour period | B.17.2 | 2B |
| 81 | Loss of integrity and/or authenticity of Data Blocks | B.17.5 | 2B |
| 82 | Incomplete or inconsistent framing data | B.17.7 | 2B |
| 83 | IVU Data Records incomplete, inconsistent or containing errors | B.17.1 | 2B |
| 84 | Implausibility of incoming Position, Alarm and Speed Records | B.17.6 | 2B |
| 85 | IVU defective for more than seven days | B.17.18 | 2B |

FIG. 10

SYSTEM FOR MONITORING VEHICLE USE

The present patent application is a national phase application of International Application No. PCT/AU2008/001749, filed Nov 27,2008.

FIELD OF THE INVENTION

The present invention relates to monitoring of vehicles and in particular, to a system for monitoring heavy vehicles and their compliance with specific network (e.g. road) access conditions using vehicle telematics solutions e.g. for regulatory purposes.

BACKGROUND TO THE INVENTION

Road transport is a popular method of transferring freight between cities, ports and distribution centres. Benefits of using the road network over other transport methods (e.g. rail, water and air) include that the cost is moderate and the fact that the road infrastructure is relatively well established. A network of roads provides efficient access to many destinations not accessible by rail, water or air.

Difficulties presented by use of the road network, particularly by heavy vehicles are that it is becoming increasingly difficult to monitor and control the road usage, and to plan for the growing infrastructure needs. Community interests are also at stake.

Jurisdictions such as councils, governments and road transport authorities develop schemes, permits, applications, notices, concessions, exemptions and gazettals which impose conditions on road usage. These conditions are intended to provide controlled access to the road network. Compliance with these conditions is important to road users and particularly heavy vehicle operators who are penalised with fines and/or licence suspensions if they are found to be non-compliant with certain conditions.

Monitoring compliance is difficult due to the number of heavy vehicles which use the road network and the number of roads which must be monitored. This is complicated further when there are different jurisdictions involved in long-distance haulage. Also, monitoring the conditions imposed typically requires monitoring a variety of different vehicle parameters such as vehicle location, vehicle speed, direction of travel, vehicle mass, time, date and so on. Driver logbooks typically focus on time, date, location by suburb and rest breaks but they do not usually record specific information relating to vehicle speed and location, mass and the like. Moreover, the logbook system is susceptible to misuse; it is not necessarily in the driver's interest to maintain evidence which substantiates a breach of a road use scheme or condition. Thus, it is rare that a vehicle logbook provides useful material for the purpose of monitoring compliance with road access conditions.

The discussion of the background to the invention included herein including reference to documents, acts, materials, devices, articles and the like is intended to explain the context of the present invention. This is not to be taken as an admission or a suggestion that any of the material referred to was published, known or part of the common general knowledge in Australia as at the priority date of any of the claims.

SUMMARY OF THE INVENTION

Unlike the domestic motor car, heavy transport vehicles do not usually have an automatic right of access to road infrastructure systems. In one of its embodiments, the present invention provides a system for remotely monitoring vehicles using in-vehicle systems that utilise sensors to monitor parameters of interest (such as position and time) and which uses wireless communications networks to transmit data from the sensors to Service Providers operating as part of the System. Service Providers transmit, automatically, non-compliance reports which are received by Jurisdictions responsible for administering the road access schemes and rules.

A Transport Operator, who is an operator of one or more vehicles eligible to apply to participate in the monitoring System, can apply to a Jurisdiction to be part of a "System Application". The System Application includes a set of conditions selected by the Transport Operator from a set of available conditions of road use. Typically, the conditions are designed by the Jurisdiction (e.g. based on schemes, permits, applications, notices, concessions, exemptions and gazettals permitting or prohibiting road use and access under certain conditions). These may be referred to as "off the shelf" conditions. However, a Transport Operator may also nominate one or more "unique" conditions when applying to a Jurisdiction for access to a road network. Once a System Application is granted, the Transport Operator is granted access to the network in the form of a System Access Condition (SAC) which specifies the unique and off the shelf conditions agreed upon.

Jurisdictions include country, state, local and other road authorities that establish the schemes and rules for road use which are monitored using the System. Jurisdictions maintain control over the approval of Transport Operators applying to participate in the System, and monitor closely the details of proposed vehicles which accompany Transport Operator requests for access to the road network. This enables Jurisdictions to determine and control what effect, if any, the Transport Operator's proposal may have on safety, infrastructure and the environment. Based on that determination, a Jurisdiction can either approve a Transport Operator's request, or it can refuse access to the road network based on the conditions of use proposed.

Once a Transport Operator's request for a System Application has been approved, it seeks out a System Service Provider (System SP) to install in a vehicle the hardware required to monitor compliance with the conditions granted to that vehicle. System SPs also provide back-office computer processing and reporting of vehicle compliance according to the System. System SPs are typically private sector monitoring companies who provide telematics services (i.e. hardware, software and associated processes) and provide the primary monitoring service in accordance with the System.

The Applicant (Transport Operator) selects a System SP from a group of organisations which have been authorised by an Authorising Body via a certification process. The Authorising Body is responsible for overseeing operation of the System and the performance of each of the participants. Participants include Transport Operators and their drivers, System SPs, Jurisdictions, and Auditors of the System. Transport Operators are operators of one or more vehicles who are eligible to voluntarily enter a scheme that requires a compliance solution offered by the inventive System.

Eligibility is typically determined by the Jurisdiction. In addition to satisfying the criteria established by the Jurisdiction in a granted SAC, Transport Operators may also need to satisfy particular accreditation criteria to be eligible to participate in the System. In Australia for example, accreditation under the National Heavy Vehicle Accreditation Scheme (NHVAS) may be required.

The System SP engaged by the Transport Operator installs an In-Vehicle Unit (IVU) in the vehicle for which the System Application has been approved by the Jurisdiction. This enables the vehicle to be monitored by the System SP for compliance with the road access conditions granted to it. If applicable, the System SP is also responsible for installation of a trailer identification device (TID) on each trailer to be used with the vehicle, and any Self Declaration Input Device (SDID) approved by the Jurisdiction for use by the Transport Operator (and its vehicle drivers).

The System SP is also responsible for notifying the relevant Jurisdiction whenever a Transport Operator's vehicle fails to comply with one or more conditions defined in an applicable SAC. Notification of non-compliant activity occurs automatically via transmission of a non-compliance report (NCR) using an electronic communication protocol such as Business to Business (B2B). In addition, the System SP provides Jurisdictions with a periodic (e.g. monthly) Participants Report (PR) which aggregates the number of non-compliance reports issued to a vehicle. The Participant's Report may additionally/alternatively aggregate the number of participants being monitored. Importantly, data processing for the purpose of generating NCRs and PRs occurs entirely independently of both the Jurisdiction and of the Transport Operator and its drivers.

In the event that non-compliant vehicular activity within a Jurisdiction is identified and a non-compliance report is electronically transmitted to the relevant Jurisdiction, it is up to the Jurisdiction's discretion as to whether or not a contractual-based caution or a formal infringement notice is issued to the vehicle involved as a consequence of that non-compliant activity.

Data forming SACs, NCRs and PRs is securely transmitted electronically between the relevant System SPs and Jurisdictions using an electronic data interchange format (e.g. B2B) preferably using existing communications infrastructure such as the Internet, with transmissions electronically signed by the respective parties, as is known in the art.

Viewed from one aspect, the present invention provides a System for monitoring a vehicle's compliance with one or more vehicle-use conditions. The system includes an in-vehicle unit (IVU) associated with a vehicle being monitored, the IVU including: a receiver for receiving positioning signals; a processor for processing a time-marked log of vehicle data; a storage element for storing the time-marked log; and a first wireless communication element for communicating time marked data to a Service Provider (SP) processing apparatus. The System also includes one or more Service Providers operating Service Provider (SP) processing apparatus, the SP processing apparatus including: a SP wireless communication element for receiving time-marked data from one or more IVUs; a SP processor for processing received data, the SP processor adapted to compare received data from the time-marked log of a vehicle with one or more vehicle-use conditions specific to that vehicle, and to generate a non-compliance report where the comparison indicates that non-compliant activity has occurred; and a SP storage element for storing non-compliance reports and relevant time-marked data.

Preferably, vehicle data and in particular position data used to generate a non-compliance report excludes data derived from low quality position signals. This ensures non-compliance reports are issued only when the supporting data exists at an evidentiary level of accuracy.

Non-compliant activity may include one or more of spatial non-compliance; temporal non-compliance; speed non-compliance; self-declaration inputs; alarm status of the IVU, or other system hardware installed in the vehicle; and alarm data generated by the SP processing apparatus.

Viewed from another aspect, the present invention provides a method for granting permission for vehicle access to a network, including the steps of: (a) an applicant electing one or more desired conditions of vehicle use in an electronic datafile; (b) transmitting the electronic datafile via electronic transmission means to a third party for approval; (c) if the electronic datafile is approved, the third party appending approval data to the datafile, giving the applicant temporary permission to access the network in accordance with the elected conditions, conditional upon, in a prescribed time frame: (i) monitoring hardware being installed in the vehicle; and (ii) using a monitoring service to monitor use of the vehicle; and (d) when the third party is notified that the hardware has been installed and the monitoring service commenced, finalising the datafile for continued permission to access the network.

Viewed from yet another aspect, the present invention provides a method for assessing a vehicle's compliance with one or more conditions of vehicle use defined in an electronic datafile; including the steps of: (a) a processor processing a time-marked log containing vehicle data for one or more parameters of vehicle use; (b) the processor comparing the vehicle data with one or more vehicle use conditions specific to that vehicle and defined in the datafile; and (c) where the comparison indicates that non-compliant activity has occurred, the processor generating an electronic non-compliance report.

Viewed from another aspect still, the present invention provides a computer program product for assessing a vehicle's compliance with one or more predefined use conditions, the computer program product storing instructions for performing a method including the steps of: (a) accessing a time-marked log containing vehicle data for one or more parameters of vehicle use; (b) for each record in the time-marked log: (i) identifying, based on the one or more predefined use conditions, those conditions which are relevant to data in the record; (ii) arranging the relevant conditions into an order of precedence; and (iii) comparing the data in the record with the relevant conditions as ordered and assessing whether the vehicle is compliant.

BRIEF DESCRIPTION OF THE DRAWINGS

The present invention will now be described in greater detail with reference to the specific embodiments illustrated in the accompanying drawings. It is to be understood that the particularity of the accompanying drawings does not supersede the generality of the preceding description of the invention.

FIG. 9 illustrates examples of vehicle categories and numbers of vehicle axes.

FIG. 10 presents a summary of alarm codes that may be included in a NCR.

DETAILED DESCRIPTION

A specific embodiment of the present invention will now be described. It is to be understood that although aspects of the described embodiment are detailed and specific, this is not to be taken as limiting on the scope of the claims appended hereto. For instance, the specific embodiments refer to use of the System to monitor vehicle compliance, particularly heavy vehicle compliance, with conditions of access to a road network. However, it is to be understood that the invention has application beyond monitoring compliance with road access conditions and may be utilised for monitoring compliance by aircraft, water-borne vessels, bicycles, mining vehicles, space craft and the like.

Figure 1:
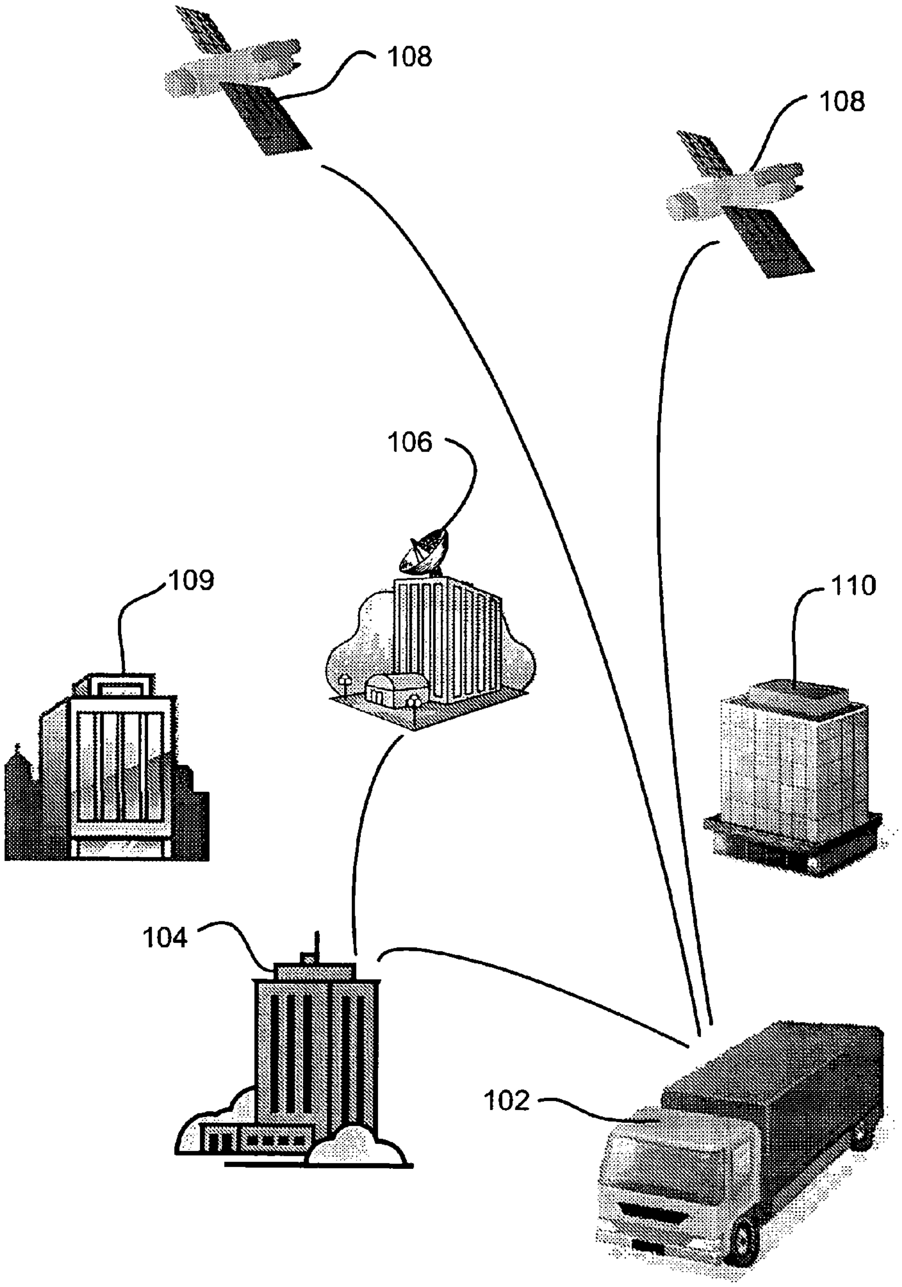
FIG. 1 illustrates the participants in a monitoring and compliance system according to an embodiment of the present invention.

FIG. 1 illustrates generally, the participants of a System according to an embodiment of the invention. A Transport Operator 102 applies to a Jurisdiction 104 to become part of the compliance System. If approved, the Transport Operator selects a Service Provider 106 to provide the hardware required and also the monitoring service which involves monitoring vehicle position using positioning data obtained from e.g. global navigation satellites 108. The System is overseen by an Authorising Body 109 who is also responsible for certification of System SPs. Performance of the participants (particularly the System SPs) may be periodically audited by approved System Auditors 110.

An important part of the present system is the hardware installed in vehicles to facilitate their monitoring. This includes IVUs, TIDs and SDIDs.

In-Vehicle Unit (IVU)

An IVU, once certified by a certifying body or the Authorising Body is provided to a Transport Operator by a System SP that is also approved by the Authorising Body to participate in the System. SP participation includes installing IVUs and other hardware in Transport Operator vehicles and also providing a monitoring service.

The IVU collects, monitors and stores sensor data from a range of sensors on the vehicle. Sensor data includes positioning data (e.g. GPS or GNSS data), and e.g. alarm data and Self Declaration data. These data are monitored to assess a vehicle's compliance with access conditions defined in a SAC applicable to the vehicle. The IVU transfers data collected from these sensors to the relevant System SP, via a communications device. Preferably this is performed by wireless means.

In a preferred embodiment, if the volume of data collected and generated prior to transfer to the System SP exceeds the data storage capacity of the IVU, new data will not overwrite stored data already obtained. This approach is preferred as it supports evidentiary purposes for which the inventive System may be used, even though it is at the expense of the ability to collect more recent data.

Wireless data transmission permits data transfers from the vehicle. This may occur in real time or near real time (e.g. every 15 to 30 seconds), irrespective of the vehicle location (with the exception of delays occurring when the vehicle temporarily travels out of range). Some applications may require more frequent reporting, i.e. transmission of data, if stipulated in the conditions of vehicle use. However it is to be understood that real time transmission of data is not essential and data may be transmitted periodically, in batches. Thus, it is contemplated that periodical transfer of data could be by wired means.

Thus, transmission of sensor data from the IVU to the System SP may be by GPRS, radio transmission, GSM, satellites or other wired or wireless means capable of maintaining the data's integrity, authentication and encryption against access or tampering by third parties. Provision for wired data transfer enables a System SP to plug in and download data e.g. in the event of an IVU malfunction or wireless data transmission malfunction.

Figure 2:
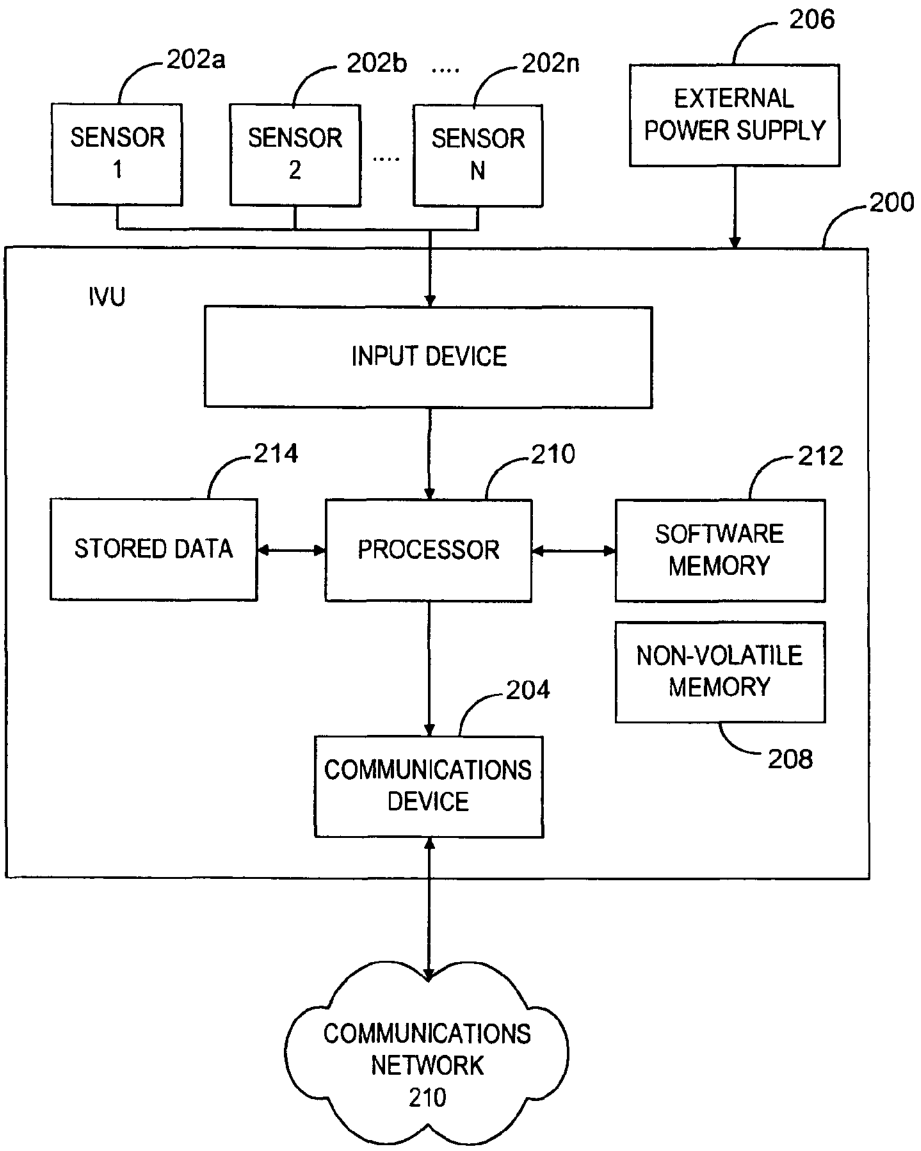
FIG. 2 is a schematic illustration of an in vehicle unit (IVU) according to an embodiment of the present invention.

FIG. 2 is a schematic illustration of an IVU 200 according to an embodiment of the invention. The IVU is robustly connected to the vehicle, i.e. the primary vehicle being monitored. The IVU includes a processor 210 and memory 212 storing rules for execution by the processor as well as a storage element 214 for storing data collected by the IVU. The IVU includes a plurality of sensors **202*a* to 202*n***, one of which includes a GPS receiver connected to a GPS antenna via an antenna cable (not shown). Other suitable positioning sensors may be utilised, particularly other forms of Global Navigation Satellite System (GNSS) sensors. It is desirable that if positioning sensors other than GPS sensors are used, prior approval is obtained from the Authorising Body before such sensors are installed in or connected with an IVU.

A range of sensors may be included to monitor other vehicle-use parameters. For example, a vehicle ignition sensor may be included to monitor vehicle movement in the absence of GPS data. In certain embodiments, a second independent movement sensor (such as an accelerometer, external air flow sensor, torque sensor or the like) may be included which provides a signal to the IVU indicating that the vehicle is moving (or stationery). Additional sensors adapted for IVU tamper detection may also be provided e.g. if a GPS antenna becomes disconnected from the IVU.

Other sensor data which may be utilised by the IVU and monitoring system generally, may be derived from other systems deployed within the vehicle being monitored. For example, sensor data may be extracted from electronic braking systems (EBS) which provide electronic management and activation of vehicle brakes. EBS systems typically monitor on board vehicle mass and vehicle mass distribution (e.g. using air bag suspension systems) to control the application of brakes and these vehicle mass parameters may be provided as sensor inputs to the IVU. Data extracted from EBS systems which is indicative of on-board mass and mass distribution can be received as inputs by the IVU and utilised to check compliance with vehicle haulage mass ratings and mass limits applicable when accessing particular roads of a road network.

Other inputs to the IVU may be provided from ancillary devices used by the driver, such as fatigue monitoring devices. Fatigue monitoring devices may include fatigue monitoring eyewear detecting eyelid movement and blink rate, and devices used to detect sideways movement of the vehicle which is frequently associated with driver fatigue. Other data designed to monitor or anticipate driver fatigue may include Self Declaration inputs confirming the identity of the driver each time the vehicle is in motion. Biometric identification means could be incorporated to safeguard against false self-declaration of driver identity.

A range of other sensors may be incorporated to monitor compliance with network access conditions. These may facilitate monitoring of data including but not limited to: vehicle noise; vehicle emissions; tanker volume monitoring and refrigeration temperature monitoring. The IVU may also be adapted to exert different levels of control over the vehicle and/or implement Intelligent Speed Adaptation (ISA) e.g. to limit the speed of vehicle operation under certain conditions, or to alert the driver e.g. in the event of detected over-speed or fatigue. In addition or alternatively, the IVU may interface with security-sensitive devices adapted to make the vehicle inoperable in the event that a security event is detected (e.g. theft of the vehicle or terrorist activity), or to enable the vehicle to be controlled by another party, e.g. a Transport Operator manager, the road authorities, or police.

A communications device 204 connected to a communications antenna via a communications cable (not shown) is also provided, together with cabling and connectors for connecting the IVU with an external power supply 206, and sensors 202*a* to 202*n*. The processor generates time marked data which is transmitted by the communications device from the IVU to the System SP via communications network 210.

Each IVU issued for use in accordance with the System is preferably allocated a unique alphanumeric identifier (IVU ID). This is used to identify the particular IVU and data which originates from that IVU. Thus data received or processed by a System SP can be identified as having originated from a particular IVU. Preferably, the unique identifier is stored on non-volatile programmable read-only memory 208 within the IVU. The IVU ID may also include a portion which identifies the System SP responsible for issuing the IVU. For example, the IVU ID may include a unique three-character pre-fix which is associated with the issuing System SP. In addition, it is desirable that the IVU ID is physically marked onto the outside of the IVU apparatus in a manner which precludes removal or modification. Etching or engraving the IVU ID are examples of suitable forms of physical marking. It is preferred that, for security purposes, the IVU ID is not re-set or altered or otherwise tampered with. The IVU ID may only be altered by the IVU-issuing System SP.

In a preferred embodiment, the IVU is protected from physical tampering by use of an enclosure which is inaccessible by unauthorised parties. In one embodiment, the IVU physical enclosure includes physical seals which are tamper evident. Thus, the seals show signs of unauthorised attempts at removal or opening of the physical IVU, although it is desirable that the IVU apparatus and seals remain intact when exposed to the vibration and impact encountered during normal use of the vehicle.

Detection of unauthorised attempts to access an IVU may be provided in accordance with applicable known standards as may construction of the apparatus (see for example AS/NZ4255.1:1994 Security Category 10, Grade B). In one embodiment, removal or opening of the IVU can occur only by breaking the seals in such a way that once broken, they cannot be re-used or reinstated. Detected attempts to access or remove an IVU or to disconnect sensors from the IVU are preferably reported by the System SP to the relevant Jurisdiction. Preferably, this occurs by wireless transmission of a tamper detection alarm or the like.

Security and confidentiality of data stored within the IVU is paramount. Thus, with the exception of access by or with authorisation from the System SP, data stored within the IVU cannot be accessed by any other party or device (including a Self-Declaration Input Device). Data records stored within the IVU are deleted only after such data is transferred from the IVU to the System SP and successful receipt is confirmed using secure communications protocols and associated handshaking as would be known to a person skilled in the art. Any compression algorithms applied to data being transferred from the IVU to the System SP is preferably lossless. Data may be communicated in blocks.

An IVU may have additional functionality built in which is not related to features required according to the System. However, any such functionality must not affect the IVU's ability to collect data and perform as required by the Authorising Body.

In accordance with an embodiment of the present invention, an IVU is type approved before being installed into a vehicle for use with the System. Type-approval involves approving the IVU for use with particular vehicle types in accordance with specifications prescribed by the Authorising Body. For instance, a Level 1 type-approved IVU is suitable for use solely with a primary vehicle such as a prime mover or rigid truck. Thus, there is no requirement for a Level 1 type-approved IVU to have a trailer designation, i.e. additional inbuilt functionality adapted to identify automatically, trailers connected to the primary vehicle.

Alternatively, a Level 2 type-approved IVU is approved to monitor a primary vehicle which has been approved for use with one or more attached trailers. Trailers attached to the primary vehicle are automatically identified by the Level 2 type-approved IVU and trailer identification information from each trailer's Trailer Identification Device (TID) is recorded. Thus, there may be more than one trailer coupled to a primary vehicle, each of which is fitted with a TID. The TID includes a memory component identifying and recording identification information for the respective trailer. Thus, each trailer attached to a prime mover is thereby identified automatically by the IVU installed on the primary vehicle.

In a preferred embodiment, the IVU is configured to collect data, either directly or indirectly, the data including but not limited to one or more of: GPS quality data, date and time data, vehicle position data, vehicle direction of travel data, vehicle speed data, trailer identification data, alarm status data and self declaration data. The IVU produces data records in a time marked log which are stored for later transmission to the relevant System SP.

Preferably, the IVU is adapted to interface with additional sensors which may be fitted to the vehicle either before or after the Transport Operator has been issued a SAC for use with the System. Additional sensors may include e.g. cargo temperature, door open/closed, load mass, driver identification (e.g. biometric) sensors to name a few. Data from these sensors may be transmitted alongside position data (and time data) to the System SP for use in assessment of the vehicle's compliance with use conditions defined in a granted SAC. Performance specifications for additional sensors are preferably prescribed by the Authorising Body to ensure that the data they supply meets the standards of accuracy required for use as "evidentiary" data.

Thus, the system architecture is scaleable to accommodate other parameters for monitoring as may be deemed necessary or desirable. Preferably, the impetus for accommodating new parameters originates from the governing bodies (and jurisdictions) responsible for controlling access to and maintaining the road networks. Although, Transport Operators and other participants may elect to monitor additional parameters using the inventive system as a means for monitoring and improving vehicle and driver efficiency, cargo care and the like.

Once additional parameters are identified for monitoring using the system, technical solutions for their incorporation can be devised in a way which satisfies the evidentiary standards required and evaluated for compliance with these standards before ultimately being made available for inclusion in a SAC sought by an Applicant.

Additional parameters that may be of interest include vehicle parameters, trailer parameters, cargo parameters, and driver parameters to name a few.

Vehicle parameters may relate to engine performance (e.g. fuel consumption, engine revolutions, clutch activations, water temperature, oil pressure, gearbox speed/revolutions, acceleration). These may be monitored using proprietary sensor systems and/or may be derived or obtained directly from engine management systems and engine condition monitoring systems available from engine manufacturers. Additionally, for vehicles fitted with electronic braking systems, vehicle parameters may include brake activations, ABS/EBS interventions, brake air pressures, tilt, yaw, angle acceleration/g-forces, wheel speed, brake pad wear etc.

Trailer parameters may include e.g. distance traveled, door opening, tilt and other brake system data (if fitted with an electronic braking system (EBS)). Cargo parameters may include e.g. temperature, g-forces, humidity, movement, etc. Driver parameters may include e.g. driver identity, and eye movement data for the detection and prevention of driver fatigue.

Additionally, a monitored vehicle may be fitted with an electronic Dedicated Short Range Communication (DSRC) toll tag which can be interrogated by the system. Similarly, most vehicles when in use will contain another wireless communication device (e.g. the driver's mobile phone) which will also be GPS equipped. Thus, the telecommunications service provider has the ability to track the mobile handset which, in other embodiments, could be used to corroborate data obtained using the on-board GPS receiver installed for use with the inventive System. Data from DSRC tags and telecommunication devices in the vehicle do not originate from the vehicle itself, but from the tolling operator or network provider and so, have the potential to add further weight to the evidentiary quality of data obtained by the System.

Positioning Signal Quality Data

Positioning signal quality data, also referred to as GPS quality data may be measured using any suitable technique such as, for example, by monitoring the number of satellites whose signal is received by the IVU and taken into account in the determination of position data and the horizontal dilution of precision (HDOP).

The IVU should demonstrate positioning (GPS) signal quality to a level prescribed by the Authorising Body. This may be established using a reference system developed by the Authorising Body, where the IVU is tested by comparison with the reference system which has been configured to obtain GPS signals to a predefined quality level.

Alternatively/additionally, GPS quality data may be obtained during simulation testing of IVUs during for example, audits performed by System Auditors, as may be invoked by the Authorising Body or scheduled to occur from time to time. This ensures that hardware installed by System SPs is capable of monitoring vehicle use parameters to the level of certainty prescribed by the Authorising Body. Simulation testing may be performed in the field, in the office or workshop.

Date and Time Data

In a preferred embodiment, the IVU collects and stores date and time data in Coordinated Universal Time (UTC) format, and it is stored with a prescribed resolution, e.g. of one second. Ideally the IVU has an internal clock operating independently of the external power supply which is capable of operating for an extended period, e.g. of twenty-eight days, in the event of power shut-off from the external power supply. In accordance with the System, the Authorising Body may prescribe a level of accuracy which must be met by the internal clock. For example, it must not deviate by more than one second from the UTC date and time over a twenty-eight day period when using GPS signals; or, it must not deviate by more than ten seconds per day from the UTC date and time over any twenty-eight day period when not using GPS signals.

Vehicle Position Data

The IVU is adapted to generate position records utilising the data it collects. The position records identify the position of the vehicle being monitored at moments time. In one embodiment, the IVU determines the latitude/longitude of the vehicle in e.g. WGS84 or GDA94 or any other suitable format recognised by the System SP. The format and tolerances of the position data are typically prescribed by the Authorising Body to ensure high accuracy is maintained. For example, the Authorising Body may prescribe that the position data shall not deviate by more than 13 metres from the absolute horizontal position for 95% of the observations made when using at least 4 satellites and a HDOP of less than 4. The Authorising Body may also prescribe the resolution of stored latitude/longitude positions calculated by the IVU (e.g. 0.00001 degrees or better).

The Authorising Body may also prescribe how quickly a GPS signal must be reacquired where there has been an interruption to the received signal. If the prescribed requirements are not met, the data may not be considered to be of a sufficiently high quality to be utilised in a data record. This ensures the positioning data which is used to determine vehicle direction of travel and vehicle speed is of sufficient quality that its use can be evidentiary in nature, and is not vulnerable to challenges that the data is "inaccurate".

In one embodiment, the position records are generated continuously while the vehicle is in operation, and stored at time intervals. The maximum time intervals at which vehicle position data is to be stored may be prescribed by the Authorising Body. For example, the Authorising Body may require vehicle position data to be stored which indicates the vehicle's position every 30 seconds during vehicle operation. A window of e.g. ±0.2 seconds may be permitted when calculating time intervals.

In an embodiment, vehicle position data includes the following: record number; date/time of position record generation; vehicle position (e.g. latitude and longitude); direction of travel; GPS quality (e.g. number of satellites used and HDOP); ignition status (on/off/disconnected); status of other independent movement sensor(s) (e.g. movement/no movement/disconnected); and trailer IDs for currently connected trailers (Level 2 type-approved vehicles only). In one embodiment, vehicle position data is blank or void where the IVU has used zero satellites or was unable to determine vehicle position.

Vehicle Direction of Travel Data

The IVU, or a positioning signal receiver associated with the IVU (e.g. a GPS receiver) is adapted to determine direction of vehicle travel. Preferably, this is in WGS84 or GDA94 format although other formats are also contemplated. The Authorising Body may prescribe tolerances for example, the direction of travel determined must not deviate from the actual direction of travel by more than 4 degrees for 95% of the observations made when using at lest 4 satellites and a HDOP of less than 4. The resolution of direction of travel may also be prescribed by the Authorising Body, e.g. the resolution may be required to be 0.1 degrees or better.

In one form of the invention, to more efficiently use the processing capabilities of the IVU and/or associated positioning signal receivers, the assessment of vehicle direction of travel is made only when the vehicle is travelling at speeds between e.g. 30 km/h and 150 km/h.

Vehicle Speed Data

In addition to determining position records, the IVU may also be configured to determine speed records indicative of a vehicle's speed at predetermined intervals or to receive speed records from a GPS receiver (e.g. GPS Doppler speed). Vehicle speed may be further validated by the System SP processor, e.g. by way of distance-time calculations. The duration of the predetermined intervals may be prescribed by the Authorising Body as e.g. 3 second intervals. A window of ±0.1 seconds may be permissible in calculating the interval.

In one embodiment, vehicle speed data is determined using a GPS Doppler derived method. The Authorising Body may prescribe that the determined vehicle speed must satisfy a predetermined degree of accuracy. For example, for vehicle speeds determined to be between 60 km/h and 150 km/h, the determined speed must be accurate to within 3.0 km/h when using at least 4 satellites and a HDOP of less than 4. Similarly, the Authorising Body may prescribe a resolution to be recorded, e.g. to 0.1 km/h or better.

In an embodiment, a speed record includes the following data: record number, date/time of speed record generation; vehicle position (e.g. latitude and longitude); vehicle speed; GPS quality (e.g. number of satellites used and HDOP); trailer IDS for currently connected trailers (Level 2 type-approved vehicles only). In one embodiment, vehicle speed data is blank or void where the IVU has used zero satellites or was unable to determine vehicle position.

Trailer Identification Device (TID) and Trailer Identification Data

A trailer identification device (TID) may be provided for each trailer couplable with a primary vehicle fitted with an IVU approved for use with the inventive system. The TID has a unique identifier (Trailer ID) that uniquely identifies the trailer and is included with data records transmitted from the IVU to the System SP for processing. It is also desirable that the Trailer ID is physically marked onto the outside of the TID apparatus in a manner which precludes removal or modification. Etching or engraving the trailer ID are examples of suitable forms of physical marking. For security purposes, the trailer ID may not be re-set or altered or otherwise tampered with. The System SP issuing the TID should be the only party able to access the trailer ID in a manner similar to the IVU identifier.

Figure 3:
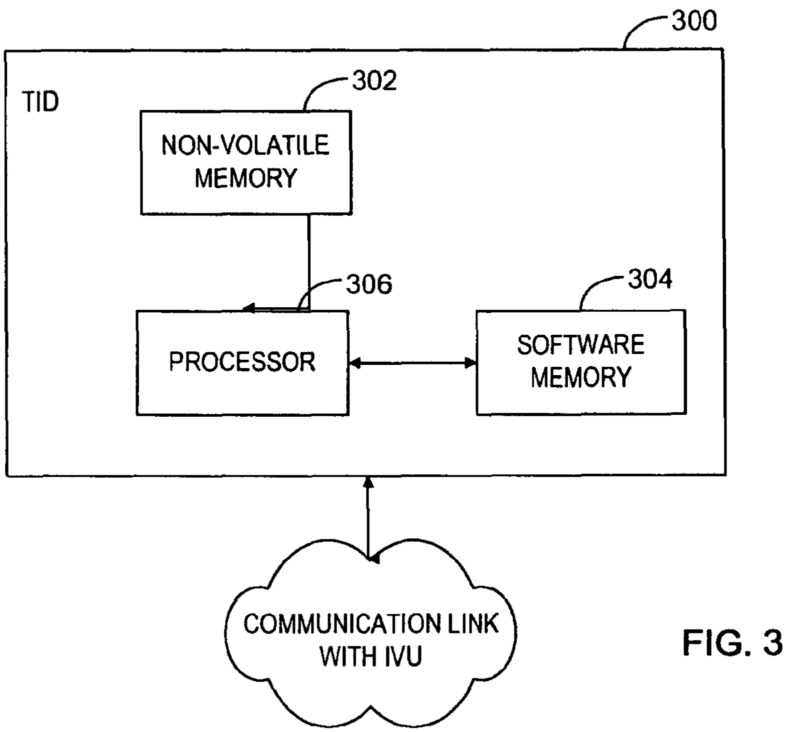
FIG. 3 is a schematic illustration of a trailer identification device (TID) according to an embodiment of the present invention.

FIG. 3 is a schematic diagram of a TID 300 according to an embodiment of the invention. In a preferred embodiment, the TID is protected from physical tampering by use of an enclosure which is inaccessible by unauthorised parties. Preferably, the TID includes non-volatile programmable read-only memory 302 which stores the trailer ID in such a way that it cannot be altered without rendering the TID permanently inoperable. In this event, the Transport Operator (or its representative, e.g. driver) will be required to return to the System SP to obtain a replacement TID for the trailer involved.

A TID is robustly connected to the trailer it identifies. The TID unit itself includes hardware, software and connectors enabling it to communicate with the IVU associated with the primary vehicle with which the trailer is coupled. Alternatively/additionally, the TID may be configured to communicate directly with the System SP responsible for its installation, maintenance and monitoring. This enables the System SP to offer a "back-office" service for monitoring trailers independently of the prime mover to which the IVU is attached. Thus, it is conceivable that the System SP responsible for the IVU in the prime mover is a separate organisation from the System SP responsible for the TID on the trailer. The TID may communicate with the IVU or the relevant System SP(s) via any suitable means including wireless and wired connections.

The TID also includes a software component 304 and processor 306 which enable the TID to communicate with e.g. the IVU in such a way that the IVU can extract and record automatically, the TID unique identifier. Preferably, this occurs automatically when the trailer(s) are attached to the primary vehicle, without the need to make an additional electrical connection between the primary vehicle (or the IVU) and the TID(s). Similarly, when one or more trailers are de-coupled from the primary vehicle, the IVU processor adjusts automatically to record the identification details of the remaining attached trailers only.

Alarm Status Data and Alarm Records

Alarm records may be generated and stored by the IVU in respect of events including but not limited to one or more of the following: the external power supply is disconnected from or reconnected to the IVU; vehicle movement is detected by one or more vehicle movement sensors while the external power supply is disconnected from the IVU; ignition sensor or other vehicle movement sensor is disconnected from or reconnected to the IVU; detection of unauthorised access to IVU data or IVU software; disconnection or reconnection of a position-sensing (e.g. GPS) antenna.

Vehicle movement data is preferably obtained from two or more movement sensors which do not utilise data from positioning signals obtained from e.g. GPS satellites. The two or more vehicle movement sensors may therefore be selected from the group including but not limited to: an ignition status sensor; and independent accelerometer; an Engine Control Module (ECM); an odometer; and a tachograph.

Preferably, each alarm record generated by the IVU includes the following data: alarm record number, date and time of alarm record generation; and the event that triggered the generation of the alarm record. When a System SP determines whether a non-compliance report is to be generated for transmission to the relevant Jurisdiction, it will refer to the alarm record triggering event to ascertain if inclusion of the alarm data/alarm status is necessary. An example of where it may not be necessary to include the alarm data/alarm status is where the battery has been disconnected from the IVU as this is common e.g. during servicing of the vehicle.

In an embodiment, alarm status data is also obtained during monitoring of a vehicle. Alarm status data may be generated for one or more of the following: the status of external power supply to the IVU; the status of one or more vehicle movement sensors; tamper detection status indicating unauthorised attempts to disconnect or remove the IVU (or a connected TID or SDID) from the vehicle, or access its contents, or its operating system; GPS antenna connections status; IVU data access status; and IVU software access status.

Self-declaration input device (SDID) and Self Declaration (SD) Data

In one embodiment of the invention, an IVU is adapted to receive input from a user interactive device operable by e.g. a driver of a vehicle. Such a device is referred to as a self-declaration input device (SDID). Thus, the IVU is desirably configured to receive, confirm receipt of and store Self Declaration (SD) data from a SDID connected to it. The IVU also generates SD records from the SD data entered into the SDID.

Figure 4:
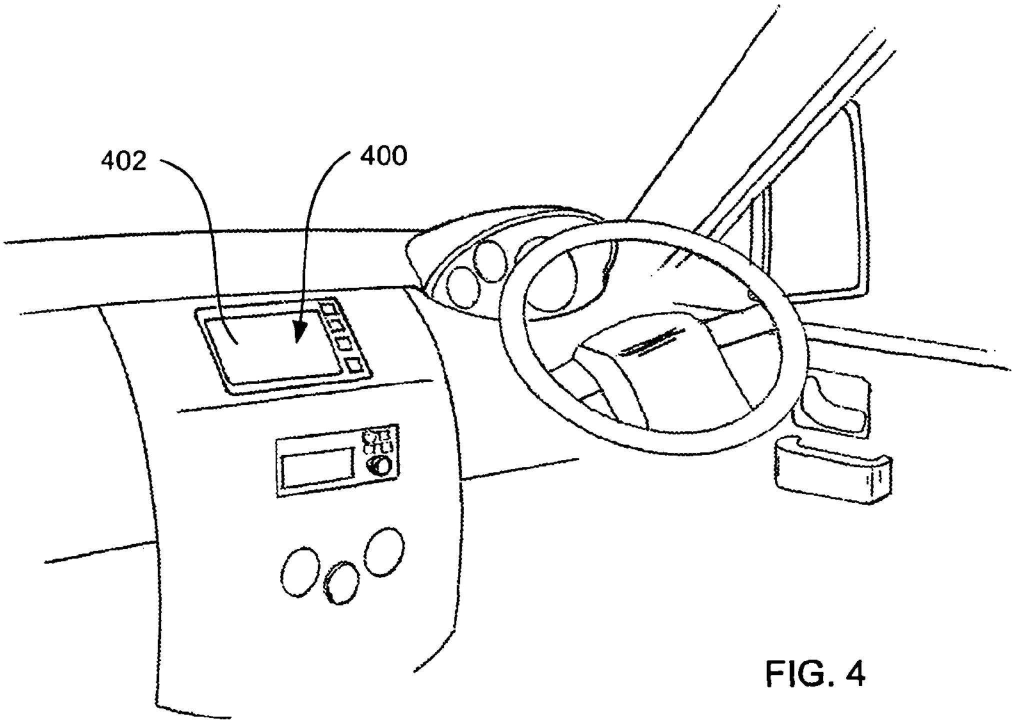
FIG. 4 is a schematic illustration of a self declaration input device (SDID) according to an embodiment of the present invention.

An example of a SDID 400 is illustrated in FIG. 4. The SDID includes data-input device 402 in the form of a touch screen, although this may be replaced with e.g. buttons or a stylus. A Display device (screen) 402 is provided so the user can read the self-declaration inputs entered. SD Entries may include vehicle category, number of axles, and total combination mass. FIG. 9 illustrates examples of vehicle categories and numbers of vehicle axes. SD Comments may also be entered. For example, where a Transport Operator is forced to make a detour onto a road which is part of an exclusion route or zone, a comment can be entered using the SDID under a comment name such as: “Road Closure”, “Redirection by authorised officer”, or “operating under special permit”. Other comment names may be used at the driver’s discretion.

A SDID used with the system is installed by the responsible System SP to ensure that the necessary protocols and evidentiary standards for data collection by the IVU are complied with, notwithstanding any self-declaration inputs that may be supplied by the driver.

In a preferred embodiment, two distinct forms of SD record exist: SD (Vehicle Type/TCM) records and SD (Comments) records. A SD (Vehicle Type/TCM) record includes at least the following data: record number; date/time of SD data generation/input into the SDID; vehicle category; number of axles; and total combination mass. The SD record may also include a version number referring to applicable System specifications prescribed by the Authorising Body. In an embodiment, the System SP refers to the vehicle category data to ascertain if a relevant SAC applies for possible subsequent reporting to the Jurisdiction.

In an embodiment, a SD (Comments) record includes at least the following data: record number; date/time of SD data generation; comment name and the text of the comment entered by the vehicle operator using the SDID. For a SD (Comments) record, the Comment name is used by the System SP to determine whether it should refer to an applicable SAC for possible subsequent reporting to the Jurisdiction.

In an embodiment, position, alarm and SD records are assigned record numbers from a single record-numbering sequence with consecutive and increasing record numbers that are assigned in order of record generation. However, speed records are preferably assigned from a separate sequence of record numbers. This enables the system to maintain a sequence of speed records around non-compliant activity relating to a speed event, whereas position, alarm and SD records are monitored constantly during vehicle movement. In each case, the series of record numbers available should rotate through a sufficiently large cycle that the same record number is not issued more than once in close proximity. For example, the same record number is not used more than once every 12 months.

In a preferred embodiment, the System SP reports immediately any SDID malfunction which appears to be the result of tampering or an attempt at tampering with the SDID unit. This report is referred to the Jurisdiction who issued the SAC. Preferably, the Transport Operator is not informed of the detection or reporting of tamper events or suspected tampering with the SDID or other hardware devices installed in the Transport Operators vehicles or trailers.

In the event that any one SDID is subject to more than one instance of malfunction (of any type including tampering or otherwise), it is preferred that the System SP notifies the Authorising Body of each malfunction and the apparent cause of the malfunction and also the remedy applied or to be applied. This enables the Authorising Body to maintain a degree of control over the performance of participants in the System, ensuring that the high standards of monitoring are maintained.

It is to be understood that self declaration data may alternatively or additionally be entered directly to the System SP processing apparatus, e.g. by uploading information via a web-based application. Alternatively/additionally, SD inputs could be supplied to the System SP by telephone, or by batch processing by the Transport Operator. Such methods of supplying self-declaration information should be approved by the Authorising Body.

Joining the System

Figure 5:
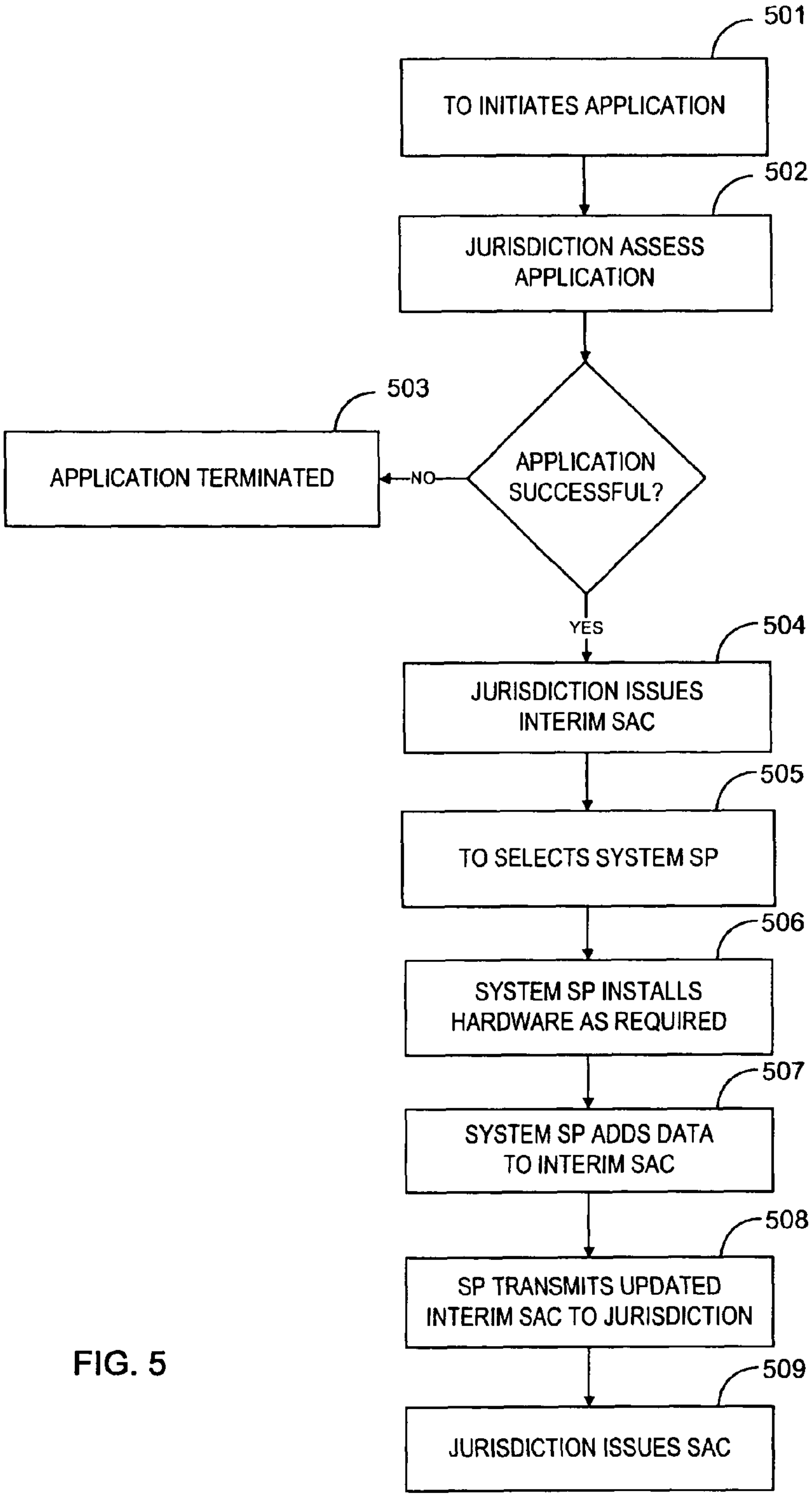
FIG. 5 illustrates steps involved and data exchanges that occur during issuance of a System Access Condition (SAC).

FIG. 5 illustrates steps involved when a Transport Operator seeks access to a road network by acquiring a SAC. A Transport Operator joins the System by initiating a System Access Application in a step 501. This is achieved by the Transport Operator submitting to the Jurisdiction of interest, data identifying one or more vehicle-use conditions under which the Transport Operator seeks access to the Jurisdiction’s road network, together with details identifying the applicant Transport Operator. Transport Operator details typically include information about the Transport Operator itself, the vehicle (e.g. vehicle identity, vehicle type, vehicle combination).

In a step 502, the Jurisdiction assesses the Transport Operator’s application. If the application is unsuccessful, it is terminated in a step 503. If the assessment is successful, the Transport Operator’s application is accepted and in a step 504 the Jurisdiction issues an Interim System Access Condition (Interim SAC) to the Transport Operator. An Interim SAC indicates the Jurisdiction’s intention to grant the final SAC to the Transport Operator, contingent on the Transport Operator engaging a System SP and successful completion of the remainder of the System Application process.

An Interim SAC is a datafile including an Identifier for the SAC applied for, together with a lapse date and the conditions as approved by the Jurisdiction. It also includes the details of the Transport Operator and its vehicle combination (e.g. primary vehicle only, primary vehicle plus trailers). This preferably includes a Vehicle Identification Number (VIN) for the vehicle identified in the interim SAC, or another identifier such as the vehicle chassis number or engine number. This enables the System SP to verify that the vehicle being fitted with the monitoring hardware is the same vehicle for which the Jurisdiction issued the Interim SAC. An Interim SAC can be cancelled by the Jurisdiction at any time after it has been issued, but only prior to the lapsing date or the final SAC being issued by the Jurisdiction, at the completion of the application process.

Once the Interim SAC issues, the Transport Operator selects a System SP that has been certified by the Authorising Body (step 505) and in a step 506 takes the Interim SAC to the selected System SP who installs the necessary hardware in the Transport Operator’s vehicle (step 506). This hardware includes an IVU and, where applicable, a SDID. Where the IVU installed in the vehicle is Level 2 type-approved, the System SP may also install TIDs in trailers to be used with the vehicle in which the Level 2 type-approved IVU has been installed. When hardware installation is complete the System SP adds to the Interim SAC data identifying itself (i.e. the System SP selected by the Transport Operator to monitor the vehicle), and data identifying the IVU and other devices it has installed on the vehicle (step 507). Then, in a step 508, the updated Interim SAC is sent electronically, to the Jurisdiction. Preferably, this electronic transmission is via a Tier 1 data interchange, as defined below.

Upon receipt of the updated Interim SAC from the System SP, the Jurisdiction appends its assessment data, together with an Identifier to identify the final SAC which has ultimately been granted to the Transport Operator. The Transport Operator is finally issued the final SAC defining the constraints agreed upon and within which the Transport Operator can access the Jurisdiction’s road network.

Conditions which are specified in the System Access Condition may be “off the shelf” or they may be “unique”. In one embodiment, "off the shelf" conditions are published by Jurisdictions and are assigned identifiers so they can be quickly and easily selected or identified by a Transport Operator seeking to submit an Application for a SAC. A Jurisdiction may update or revise the content of an "off the shelf" condition at any time. In the event, that an "off the shelf" condition selected by a Transport Operator is revised, the selected condition will automatically adopt the features of the most recent revision. Similarly, a Jurisdiction may offer a set of "off the shelf" conditions. In either case, if a Transport Operator has a SAC granted which refers to one or more "off the shelf" conditions these will be updated automatically to reflect any revisions to those conditions which are made by the Jurisdiction, without the need to cancel the original SAC and issue a replacement.

In contrast, a "unique" condition is a condition which is individually negotiated between the Transport Operator and the Jurisdiction. Once agreed upon, the features of the unique condition are embedded in a data file ultimately defining the granted SAC which includes the unique condition. Since the details of a unique condition are embedded in individually negotiated SACs, they typically cannot be changed or revised. Instead, if a change is required the Transport Operator must apply to the Jurisdiction for the issuance of an entirely new SAC. The original SAC will be cancelled.

Conditions which may be defined in a System Access Condition include, but are not limited to, spatial conditions, temporal conditions, speed conditions and self declaration conditions.

In one embodiment, the process by which a Transport Operator may apply to join the System may be referred to as a System Application. The Application is an electronic datafile that includes SAC identifying information, SAC conditions (Part 1), Transport Operator details (Part 2), System SP, IVU and TID installation details (Part 3) and Jurisdictional assessment (Part 4). Data for Part 1 and Part 2 is collected, entered into a datafile and held by the Jurisdiction. The Jurisdiction assesses the application and either issues an Interim SAC or terminates the application. If an Interim SAC issues, data for Part 3 is submitted by the System SP to the Jurisdiction via a Tier 1 communication (see below) and added to the datafile. Once the data in Part 4 is added to the datafile by the Jurisdiction, Parts 1 to 4 are issued, as the final SAC.

Spatial Access Conditions

Spatial conditions can include route conditions and zone conditions and these are used to specify where a vehicle is or is not allowed to travel. Thus, in a preferred embodiment of the invention a spatial condition is specified as one of an inclusion route/zone, absolute inclusion route/zone (both defining where access is allowed) and an exclusion zone (where access is not allowed), or Background. Route and zone spatial conditions exist and like other conditions, are specified by the issuing Jurisdiction responsible for approving the SAC.

Route conditions and zone conditions are defined using a contiguous set of links that are identified using persistent identifiers. In one embodiment, the persistent identifiers are sourced from an Intelligent Access Map (IAM). An IAM may be proprietary, e.g. to the Authorising Body. Alternatively, the persistent identifiers may correspond to global navigation coordinates, e.g. latitude and longitude indicators which can be used in respect of any global navigation-based map system approved by the Authorising Body. In any event, the persistent identifiers demonstrate geographically, the location (e.g. end points or boundaries) of a defined spatial condition.

A route condition describes a route where access is allowed or is not allowed, using a set of contiguous persistent identifiers or pre-defined links that identify the route from end to end. The first and/or last links in a spatial condition may be specified as partial links, rather than complete links. Thus, for a particular spatial condition a route start position may be specified by its latitude and longitude which limits the route to that position onward even though it is mid-way along the first link of the route. Similarly, a route end position may be specified by its latitude and longitude which limits the route to that location which is located part-way along the last link of the route.

A zone condition describes an area or region where access is allowed or is not allowed, using a set of contiguous persistent identifiers that describe a closed polygon. This closed polygon defines the boundary of the zone which may be an inclusion zone or an exclusion zone. Thus, an approved vehicle may travel freely anywhere within an inclusion zone, subject to any exclusion zones taking precedence.

In a preferred embodiment, a spatial condition specifying an inclusion/exclusion route, defines the route as including a window each side of a road or route centreline. Similarly, a spatial condition specifying an inclusion zone preferably includes a window extending outward from the inclusion zone boundary (and more preferably from an IAM road centreline by which a boundary may be defined). The window may be e.g. 50 metres, 100 metres or 150 metres from the boundary or centreline although these window values are examples only. Use of a window factors a degree of tolerance into the compliance system to eliminate spurious or inadvertent detection of non-compliant activity that is not a true breach of an agreed spatial condition.

One or many spatial conditions may be included within a SAC to define cumulative access granted to the vehicle. A spatial condition (i.e. route or zone condition) will apply 24 hours per day, 7 days per week while the SAC is active, unless the SAC is further qualified by a temporal access condition.

Within a SAC, any area of the Jurisdiction which is not specified in a spatial access condition is referred to as SAC Background and this can be denoted by the Jurisdiction as either inclusion or exclusion.

Where a SAC specifies more than one spatial condition, they are assigned an order of precedence as follows:

a. absolute-inclusion (takes precedence over all others);
b. exclusion (takes precedence over inclusion);
c. inclusion; and
d. Background.

Temporal Conditions

Temporal conditions are typically used to qualify spatial conditions. Where a temporal condition is used to qualify a spatial inclusion condition, then the spatial condition will only permit access to the route/zone for those days/dates and/or times specified in the applicable temporal condition. Conversely, where a temporal condition is used to qualify a spatial exclusion condition, then the spatial condition will only restrict access to the specified route/zone for those days/dates and/or times specified in the applicable temporal condition.

Figure 7:
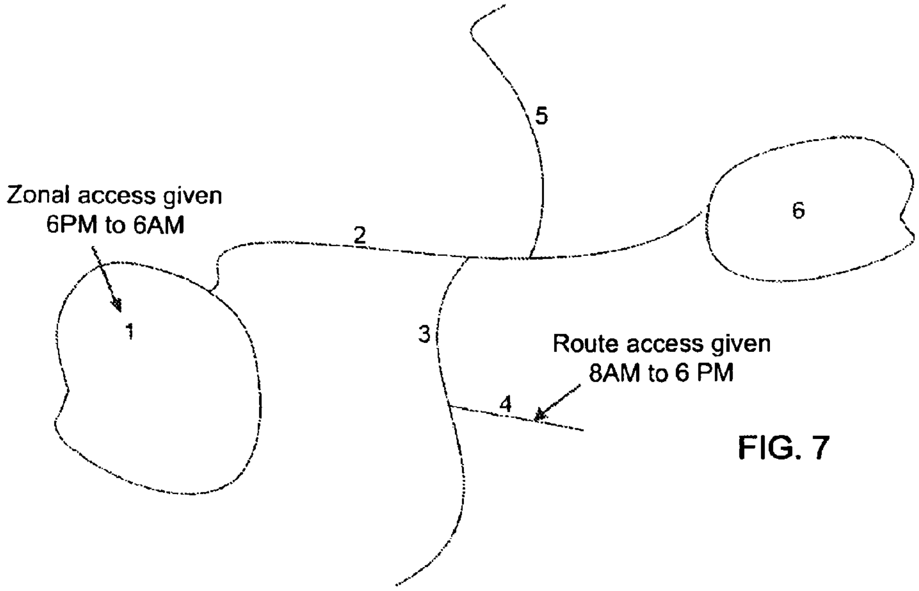
FIG. 7 demonstrates schematically, spatial and temporal conditions included in an issued System Access Condition.

Thus, in a particular SAC, a spatial condition is found to be "In Effect" at the days/dates and times specified in an applicable temporal condition also included in that SAC. FIG. 7 is an example of a cumulative set of spatial and temporal conditions specified in a single SAC. In this SAC, there are six spatial conditions defined. Spatial condition 1 is a zone condition which is qualified by a temporal condition in which access to zone 1 is permitted from 6 pm to 6 am only. Spatial condition 6 is also a zone condition but has no temporal condition qualifying it hence it applies twenty-four hours a day, seven days a week. Spatial conditions 2, 3, 4 and 5 are route conditions. Route condition 4 is also qualified by a temporal condition which permits access to route 4 from 8 am to 6 pm only. Spatial conditions 2, 3, 5 and 6 permit access twenty-four hours per day, seven days per week since they have no applicable temporal conditions.

Where a spatial condition specifies where access is not permitted and is qualified by a temporal condition, access is only restricted for the days/dates and/or times specified in the temporal condition.

In other embodiments, temporal conditions may be imposed e.g. where a licence restriction is placed on an individual who has been convicted of an offence for which the penalty is licence cancellation, but where the defendant has made a showing that the driving licence is required to travel to and from work. In such situations a temporal condition alone may be applied by a magistrate or judge, wherein the vehicle will be non-compliant if vehicle movement is detected outside of the permissible temporal limitations imposed.

Speed Conditions

Speed conditions specify the maximum speed usage (i.e. a speed threshold) of a vehicle. Preferably, a single speed condition (threshold) applies throughout a SAC-issuing Jurisdiction although conceivably more than one speed condition could apply in a Jurisdiction. Also, a speed condition could be specified in more than one SAC issued to a vehicle, e.g. when a vehicle is used in multiple Jurisdictions.

Where a vehicle operating under a speed condition is limited to only one speed threshold applicable throughout a Jurisdiction and across jurisdictional borders, it is the responsibility of the Jurisdictions affected to ensure that the threshold is consistent.

Where speed record processing (i.e. determination of speed records using e.g. position data obtained) is performed by the IVU processor, the IVU may store the speed threshold in memory. Alternatively, where speed record processing is performed by the System SP processor, it is not necessary for the IVU to retain the speed threshold in memory.

Preferably, a speed condition is not the only condition specified in a SAC. The SAC should also include at least one a spatial condition that describes the spatial access granted to the vehicle in the relevant Jurisdiction, and which is qualified by the speed condition granted for that access.

Figure 8:
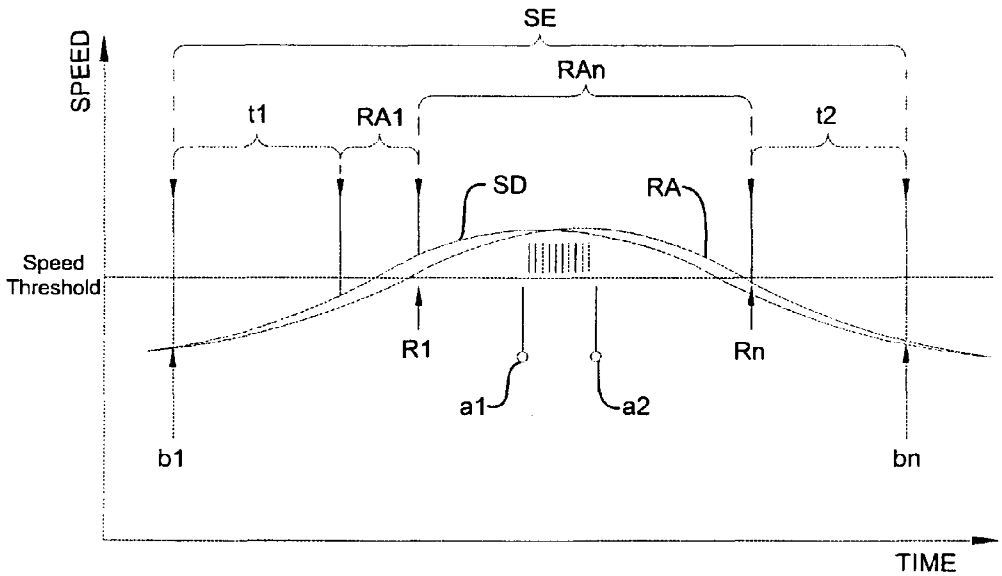
FIG. 8 is a schematic diagram illustrating speed data records considered when determining a speed event, according to an embodiment of the invention.

A Speed Event occurs where a vehicle is non-compliant with an applicable speed Condition, i.e. if speed records determined for a vehicle indicate that a speed threshold defined in an applicable SAC has been exceeded during vehicle use. In one embodiment, the speed threshold is determined to have been exceeded where an average value of a pre-determined number of speed records exceeds the speed threshold. Preferably, the average value is calculated using a rolling or "moving" average which more accurately indicates the longer term trend of the vehicle's speed than simply calculating the arithmetic mean. FIG. 8 is a schematic diagram illustrating speed data records considered when determining a speed event, according to one embodiment of the invention. The speed data records denoted SD may be determined by the IVU or the System SP using collected position and time data. Rolling average values are denoted RA.

A speed event SE is shown as including speed data records commencing at b1 and ending at bn. This includes records shown at RA1 used to calculate the first rolling average value, R1 which exceeded the speed threshold, plus the determined speeds shown at RAn used to calculate the rolling average values which continue to exceed the speed threshold, ending at Rn. In a preferred embodiment the SE data further includes lead-in speed data for a time period t1 (e.g. sixty seconds), and lead-out data for a time period t2 (e.g. sixty seconds). The lead-in and lead-out data included in a Speed Event can be used by a Jurisdiction to determine whether or not to issue an infringement notice.

Preferably, the rolling average is calculated for ten consecutive speed records (e.g. a1 to a10). In a preferred embodiment where speed is determined using position signals received by the IVU, these records are only utilised when the position signal quality for each of those records meets the standards prescribed by the Authorising Body (e.g. at least four satellites with a HDOP of less than four) although this is not considered to be crucial for records in the lead in and lead out time periods t1, t2. If records available for the lead-in or lead-out periods are for less than t1 or t2 seconds, the speed event should include all available speed records in the lead-in and/or lead-out period.

While the illustrated embodiment illustrates the rolling average being calculated for a window of ten consecutive speed data records, it is to be understood that the Authorising Body may prescribe the use of more or less data records in the determination of the rolling average speed.

Preferably, the System SP processor executes the processing necessary to identify a speed event and the speed records comprising that event. However, it is to be understood that such functionality may alternatively/additionally be built into the IVU processor.

System Service Provider (System SP)

Figure 6:
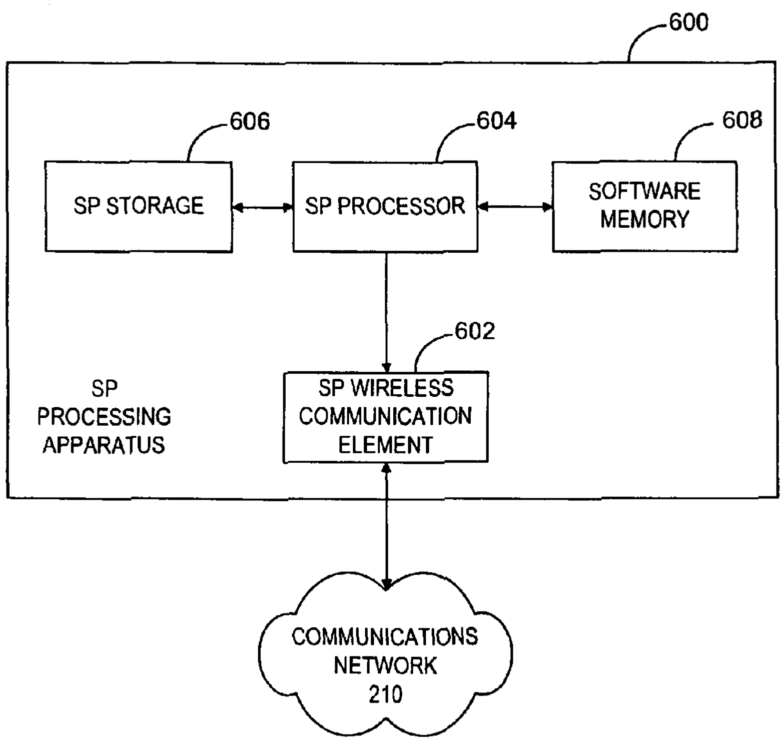
FIG. 6 is a schematic illustration representing features of a Service Provider.

Each certified System SP is capable of receiving, implementing and assessing a vehicle's compliance with the conditions defined in an approved/issued SAC (including an Interim SAC). FIG. 6 is a schematic illustration of components of Service Provider processing apparatus 600. The apparatus includes a SP wireless communication element 602 adapted to receive vehicle data records transmitted from IVUs using via communications network 210. SP Processor 604 performs the processing necessary to generate non-compliance reports, according to instructions stored in software memory 608. SP Storage element 606 stores non-compliance reports and non-compliance data for transmission to Jurisdictions via communications network 210.

Where a vehicle is operating under multiple SACs, the System SP possess the hardware and processing attributes required to assess compliance against all of those conditions, as is required by the Authorising Body. In a preferred business model, a System SP commences monitoring of a vehicle for compliance within one working day after receiving the issued SAC from the issuing Jurisdiction, or on a SAC commencement date set by the Jurisdiction.

In a further preferred business model, a System SP notifies the Authorising Body automatically when it has in service a pre-defined percentage (e.g. 80%) of the number of IVUs for which it has been certified to operate. This will flag the System SP as one to watch as being close to its monitoring capacity, to ensure that it continues to monitor vehicles to the standards required by the Authorising Body. System SPs also provide programmed maintenance of hardware it installs replacing batteries, seals and connections where necessary. Where hardware malfunctions are recognised, the Jurisdiction is to be notified and informed of the remedial action to be taken and when. The same applies where there is evidence of tampering with hardware installed in vehicles by the System SP.

If a SAC includes a cessation date, the System SP deactivates the SAC on the stipulated date, if it has not been preceded by a request (e.g. from a Transport Operator or a Jurisdiction) for cancellation of the SAC. If a Transport Operator seeks to cancel an issued SAC, it can request the relevant Jurisdiction to take the necessary action. A System SP may apply to a Jurisdiction to cancel an issued SAC, by submitting a request over a Tier 1 data interchange (see below). In the event that a Jurisdiction cancels a SAC, it will communicate the SAC with a "cancelled" status to the System SP over a Tier 1 data interchange. In this event, in a preferred business model the System SP deactivates the SAC within a working day of receiving notice of the cancellation from the Jurisdiction.

As a participant in the system, each System SP supports electronic data interchanges with other participants in the system, including Jurisdictions and the Authorising Body. Two levels of data interchange should be supported at a minimum. A Tier 1 interchange involves a higher level of privacy and security for data transferred in transactions. A Tier 1 data interchange may be supported using, for example, an automated B2B interface employing web services, although other secure automated systems are also contemplated, particularly those which adopt SSL or other high-security protocols during transmission. Tier 1 data interchanges should be adopted for:

a. transmission of SACs between parties (e.g. from a Jurisdiction to a System SP);

b. requests for cancellation or replacement of a SAC; and c. delivery of Non-Compliance Reports and Participation Reports (to a Jurisdiction or the Authorising Body).

Other communications between participants in the system may occur via a Tier 2 data interchange. Tier 2 data interchanges may be supported by other electronic transmission protocols including secure email and ftps or ftp with SSL. Alternatively, traditional communication processes such as registered mail may be used.

During use of a vehicle, the IVU periodically transfers the time-marked data obtained from the vehicle sensors to the System SP responsible for installation and monitoring of that IVU. Periodic transfer may be e.g. once every 24 hours or as soon as practicable thereafter when a communications network has not been available at the scheduled transfer time but has recently come back online. Transfers may occur more regularly where it is anticipated that the number of records in the time-marked log is almost due to exceed the storage capacity of the IVU.

The System SP assesses the IVU data records against all applicable SACs which have been issued (and updated from time to time where off the shelf conditions have been used) to determine whether any non-compliant activity has occurred. If non-compliant activity is identified, the System SP notifies the relevant Jurisdiction automatically, via transmission of a NCR using a Tier 1 electronic data interchange.

Non-Compliance Reports (NCRs)

A NCR may take a number of different forms, depending on the requirements of the participants and in particular the Jurisdiction to whom the NCR is communicated. Typically, the Authorising Body overseeing the System prescribes the form and content of NCRs. Minimum information to be included in a NCR is: the nature of the non-compliant activity for which the NCR has been issued (e.g. spatial, temporal, speed, alarm, self declaration); the duration of non-compliant activity including commencement time and position and end time and position and preferably, total duration of non-compliance. The NCR should also include the time and date on which the NCR was generated by the System SP (local SP time).

NCR reports contain, as applicable, NCR position records, NCR speed records, NCR alarm records—Type 1; NCR alarm records—Type 2A, NCR alarm records—Type 2B and NCR SD records. Preferably NCRs are transmitted from System SPs to the relevant Jurisdiction via a Tier 1 data interchange, after which time the Jurisdiction can take enforcement action if necessary.

When assessing a data record for spatial non-compliance, the System SP identifies applicable SACs as those which correspond to the vehicle combination, date/time and vehicle position as recorded in the data record received from the vehicle IVU. Thus, the assessment involves: identifying the set of spatial conditions which are relevant to the vehicle's position; select those conditions which are "in effect" at the time of data collection and separating the in effect conditions into a hierarchy. Thus, an absolute-inclusion spatial condition takes precedence over all other spatial conditions. If no absolute-inclusion condition exists, an exclusion condition takes precedence over inclusion conditions and the SAC Background which may be designated as "inclusion" or "exclusion".

If a vehicle is assessed to be spatially non-compliant, the System SP should then also assess if the vehicle is additionally temporally non-compliant. Temporal non-compliance is found to occur where the vehicle is spatially non-compliant at the position under consideration and there is at least one temporal condition which applies to that position.

In one embodiment, a NCR includes all NCR position records for the full period of non-compliance. Contingencies are provided where the period of non-compliance is longer than 72 hours, and/or an event occurs which renders the System SP unable to continue assessing non-compliant activity, e.g. when the vehicle crosses a Jurisdiction's border.

Preferably, a spatial or temporal NCR is issued only where two or more consecutive position records in a time-marked log are found to be spatially or temporally non-compliant. The NCR includes all NCR position records for the full period of non-compliance, commencing with the first non-compliant position record and ending with the first collected of either: a) the last non-compliant position record preceding the first subsequent compliant position record; b) the last non-compliant position record collected within 72 hours of the first non-compliant position record; or c) the last position record collected prior to some event occurring which renders the System SP unable to continue assessing the non-compliant activity. A period of data records corresponding to compliant vehicular activity may be included either side of the non-compliant period to indicate the vehicle's behaviour around that time.

Where a data record indicates that, for a particular vehicle combination, date/time and vehicle position, there has been a period of non-compliance with an applicable speed condition, a Speed NCR will be issued, including speed data records collected during the period of speed non-compliant activity. This is known as a "Speed Event". Where a Speed Event crosses a Jurisdiction's border, a Speed NCR will issue to each of the Jurisdictions affected.

For a Speed NCR, the applicable SACs over the period of a speed event are identified and where these include at least one speed condition, the System SP assesses and reports the entire speed event to the Jurisdiction. When assessing speed non-compliance, the applicable SACs are those pertaining to the particular vehicle combination, date/time and vehicle position as may be specified within the speed record being assessed. All speed records for the speed event are included in a Speed NCR. A Speed NCR will be issued, when necessary, irrespective of whether the vehicle is spatially or temporally compliant or non-compliant during the period of the Speed Event.

When assessing vehicle position for the purpose of determining speed and position non-compliance, where the vehicle is deemed to be outside of e.g. 13 metres of a boundary or road centreline defining a spatial condition, or where there are two or more possible roads on which the vehicle may be located, it is preferred that the location details are left blank. This avoids any potential adverse assessment where there is insufficient (or conflicting) evidence to substantiate an assessment of non-compliance.

For spatial, temporal and speed NCRs, if at least one of the SACs listed in the NCR includes at least one SD condition, the NCR shall also include all relevant NCR SD records. Preferably this includes records from the 24 hour period prior to the NCR beginning date/time for spatial and temporal NCRs and the first included speed record for a speed NR; and all NCR SD comments records for a 12 hour period following.

In one embodiment, in addition to all the data records for the time during which the vehicle was spatially or temporally non-compliant, an NCR also includes one or more records before the first non-compliant record. This may include records for a period of 1, 2, 3, 4, or 5 minutes, for example, prior to commencement of the period of non-compliant activity. Similarly, the NCR may also include one or more records immediately following the last non-compliant record for a period of, for example, 1, 2, 3, 4 or 5 minutes. This enables a Jurisdiction to consider a Transport Operator's behaviour either side of a period of non-compliant activity when deciding whether or not to issue an infringement notice.

Further, when issuing a NCR the System SP may also check the data records for the presence of alarm records transferred from the IVU. Alternatively/additionally, the System SP may generate alarm codes based on data tests conducted in respect of time-marked data received from an IVU. FIG. 10 sets out a summary of alarm codes which may be included in a NCR although this is not to be construed as a compulsory or an exhaustive set of codes.

For Alarm NCRs, the System SP checks for the presence of alarm records transferred from the IVU and alarms generated by the System SP as a result of data testing by the System SP intended to detect irregularities, inconsistencies or implausible data in records that have been transferred from the IVU. Preferably, the System SP uses alarm codes (e.g. of the kind set out in FIG. 10) when reporting alarm records and alarms to a Jurisdiction in an alarm NCR. In FIG. 10, Alarm Codes 1 to 12 relate to IVU alarm records and alarm codes 51 to 59 relate to alarms generated by the System SP. Alarm records with alarm codes 3 to 12 may be designated alarm record type 1. Alarm records with alarm codes 51 to 59 may be designated alarm record type 2A. Alarm records with alarm codes 80 to 85 may be designated alarm record type 2B. For type 1 alarm records, the Alarm NCR includes position records. For type 1 and type 2A alarm NCRs, if there is an applicable SD condition, the Alarm NCR also includes SD condition type and all relevant SD NCR records for a period (e.g. 24 hours) leading up to the alarm event triggering the Alarm NCR and a period (e.g. 12 hours) after.

A System SP triggers a SD (Vehicle type/TCM) NCR when a self-declared TCM value exceeds the TCM threshold for the vehicle type. This NCR will issue irrespective of whether there is concurrent spatial, speed or temporal compliance. Position records may be included in the NCR.

Typically, any IVU will have only one applicable speed condition (e.g. a speed threshold applicable throughout a Jurisdiction). However, where there is more than one speed condition (i.e. speed threshold) defined in SACs applicable to an IVU, separate NCRs may be issued when the vehicle is non-compliant with each individual applicable speed condition. A separate NCR may be issued each time a spatial or a temporal condition is invoked, the report listing each individual SAC against which the non-compliant activity is detected. NCRs should be issued within one working day of the data records being transferred from the IVU to the System SP responsible for processing the data and assessing the vehicle's compliance.

It is desirable for NCR data to be retained by the System SP for a period of time as may be prescribed by the Authorising Body, for future use. Future use of retained NCR data may include use in proceedings in which, for example, an infringement notice is challenged by a Transport Operator or enforced by a Jurisdiction.

When a vehicle demonstrates non-compliant activity for an extended period (e.g. longer than 72 hours), the SP may issue more than one NCR and, for example, issue a NCR after each 72 hour period for which the vehicle has been continuously non-compliant. This applies to both temporal and spatial non-compliance as well as speed, alarm, self declaration and other non-compliant activity.

Where there is a conflict between conditions specified in a SAC which has been approved by a Jurisdiction, or where there are irregularities, the System SP should report these to the SAC issuing Jurisdiction. Instances of irregularities may include, for example, where any of the persistent identifiers used to specify a spatial access condition do not exist within an IAM or other map being used; where a spatial access condition intended to specify a zone is identified by a set of persistent identifiers that do not define a closed polygon; and where a SAC cessation date is after a "valid to" date stipulated in e.g. an "off the shelf" condition.

Participants Report (PR)

In an embodiment, System SPs issue to Jurisdictions specific periodic Participants Reports (PRs) which sets out the aggregated data that is provided by the System SP to the Jurisdiction over the reporting period (e.g. monthly). A PR is generated for every Jurisdiction which issued SACs that were applicable to any of the vehicles being monitored by the System SP during the reporting period. Preferably, a PR also includes details of SACs newly issued to Transport Operators during the reporting period.

The PR also reports on all vehicles monitored at some time during the reporting period. This enables Jurisdictions to establish NCR tallies for a reporting period and may enable Jurisdictions to plan future infrastructure development and road use schemes and permits. Preferably, PRs are delivered to Jurisdictions automatically by way of Tier 1 data interchange.

Since a NCR includes all the data points in the time-marked log during the period of non-compliant activity, Jurisdictions are able to ascertain the duration of the non-compliant activity, and may elect not to issue an infringement notice, e.g. if the period of non-compliance was very short. Additionally, for vehicles fitted with a SDID, the NCR will also include data corresponding to self-declaration inputs from the Transport Operator or its representative (e.g. the vehicle driver). The self declaration data may be utilised by a Jurisdiction to explain the non-compliant activity (e.g. road works forced a delay resulting in temporal non-compliance, or a detour due to road construction forced spatial non-compliance). This additional information could prevent the issuance of an infringement notice which would otherwise have likely been appealed or challenged by the Transport Operator improving efficiency in assessing compliance.

The present invention facilitates use of telematics solutions in a vehicle monitoring system which permits recordal of data pertaining to vehicle use which is of evidentiary nature. This is supported by the collection and recordal of data sets indicative of vehicle compliance or non-compliance over a period of time. This is a distinct improvement over prior art monitoring systems which record non-compliance at a moment in time only, that is by recording a single non-compliant data point. By including a series of points as evidence indicating non-compliance it is anticipated that in using the present system, Transport Operators will more willingly accept warnings and/or infringement notices issued by Jurisdictions and more importantly, take steps to improve practices to ensure compliance in the future.

Advantageously, embodiments also permit collection and recordal of vehicle use data for periods of time preceding and following non-compliant vehicular activity forming a vehicle use "history". This arms Jurisdictions with further important information which may influence their decision to issue a notification to a Transport Operator. Moreover, collection and recordal of "self declaration" inputs can be utilised by Jurisdictions in their assessment of non-compliant vehicular activity.

In addition, the present system takes account of the quality of the signals which are used to determine vehicle position and hence direction of vehicle travel and speed. Where the signal quality does not meet prescribed levels, the data is not relied upon.

This multi-point and multi-parameter approach to determining non-compliance gives Transport Operators confidence in the System and potentially eliminates the opportunity for false NCRs being issued.

The system is also operable across jurisdictions due to the consistency of monitoring which is achieved by defining conditions of vehicle use in electronic SAC datafiles.

The present invention also permits use of a Business Model in which various private companies can be certified as Service Providers and negotiate contractual terms with Transport Operators utilising their services. The Transport Operator therefore has freedom of choice in determining who will provide the monitoring service, but can still have confidence that whichever System SP is selected, it will be required by the Authorising Body to perform the service to prescribed standards, or risk losing its certification. Periodic auditing by System Auditors enhances the business model.

Automating the SAC application process by applicants, Jurisdictions and System SPs updating an electronic application datafile also makes it easier and faster for Transport Operators to gain access to road networks according to the System. Where Transport Operators elect "off the shelf" conditions in an application, once the SAC finally issues, any updates are adopted automatically, without any extra effort required from the Transport Operator operating under the SAC. Similarly, in embodiments where a proprietary map (e.g. IAM) is used to define spatial conditions, map updates occur automatically when the Authorising Body controlling the map supplies the updates to the System SPs. This process is transparent to Transport Operators.

By assigning the monitoring task to certified System SPs, opportunities are presented for improved contract management, where the Authorising Body and e.g. governments can oversee and audit the performance of service contracts between Transport Operators and System SPs. This can facilitate improved structuring and targeting of concessions, and supports cooperative solutions to transport issues which are identified in the process.

Road authorities benefit from use of the System as they are able to provide better management of the road networks e.g. by monitoring PRs, and plan increased capacity to provide for growing freight transport needs. There are also flow on effects for improved safety and infrastructure, together with opportunities for improved environmental management, and management of community expectations.

It is to be understood that various modifications, additions and/or alterations may be made to the parts previously described without departing from the ambit of the present invention as defined in the claims appended hereto.

The claims defining the invention are as follows:

1. A system for monitoring a vehicle's compliance with one or more designated vehicle-use conditions for accessing a transport network, the system comprising:

(a) an in-vehicle unit (IVU) associated with a vehicle being monitored, the IVU comprising:
  - a receiver for receiving positioning signals:
  - a processor for processing a time-marked log using at least in part the positioning signals;
  - a storage element for storing the time-marked log; and
  - a first wireless communication element for communicating time marked data of the time-marked log to a Service Provider (SP) processing apparatus; and (b) at least one Service Providers (SP) processing apparatus, the SP processing apparatus comprising:
  - a SP wireless communication element for receiving the time-marked data from one or more IVUs;
  - a SP processor for processing the time-marked data, the SP processor adapted to compare the time-marked data from the time-marked log of a vehicle with one or more vehicle-use conditions that are specific to that vehicle, and to generate a non-compliance report where the comparison indicates that non-compliant activity associated with the one or more vehicle use conditions has occurred; and a SP storage element for storing non-compliance reports and relevant time-marked data;

wherein the one or more vehicle-use conditions monitored for compliance are specific to the vehicle being monitored, said conditions having been defined electronically in a datafile unique to that vehicle.

2. A system according to claim 1, wherein the SP processing apparatus automatically and electronically communicates details of non-compliance reports to a third party.

3. A system according to claim 1 wherein the SP processor generates a non-compliance report referring to vehicle speed when a speed event is identified.

4. A system according to claim 3 wherein a speed event is identified for a vehicle when an average value of speed data in the time marked log pertaining to the vehicle exceeds a vehicle speed threshold specified in an applicable condition of vehicle use.

5. A system according to claim 4 wherein the average value is a rolling average value calculated over at least ten speed records in the time-marked log.

6. A system according to claim 1 wherein the SP processor is configurable to receive further time-marked data pertaining to new parameters designated to be of relevance by a third party.

7. A system according to claim 5 wherein the pre-determined number of speed records are spaced at 3 second intervals.

8. The system according to claim 1 wherein the conditions are based on one or more applicable temporal access conditions.

9. A system according to claim 1 wherein a non-compliance report generated in respect of a vehicle comprises a plurality of time-marked data records including all data records in the vehicle's time-marked log for the period of time during which there was non-compliant activity.

10. A system according to any one of the preceding claim 1 wherein the time-marked data used to generate a non-compliance report excludes data derived from low quality position signals.

11. A system according to claim 1 wherein non-compliant activity comprises one or more of:

(a) spatial non-compliance;

(b) temporal non-compliance;

(c) speed non-compliance;

(d) self-declaration inputs;

(e) alarm status of the IVU, or other system hardware installed in the vehicle; and (f) alarm data generated by the SP processing apparatus.

12. A system according to claim 1 wherein a non-compliance report generated in respect of a vehicle comprises all data records in the vehicle's time-marked log for a predetermined time-period before a first non-compliant data record and/or a pre-determined time-period after the last consecutive non-compliant data record in the log.

13. A system according to claim 1 wherein the IVU is adapted to receive input from a self-declaration component operable by a vehicle operator providing inputs pertaining to an aspect of vehicle use comprising one or more of:

(a) vehicle type;

(b) vehicle category;

(c) number of axles;

(d) total vehicle mass;

(e) total combination mass; and (f) operator comments.

14. A system according to claim 1 wherein the IVU is adapted to receive input from one or more trailer-identification devices (TIDs), wherein each trailer-identification device is associated with a trailer couplable with a primary vehicle having an associated IVU, and includes a TID memory component storing a unique identifier and data pertaining to the trailer for automatic identification by the IVU when coupled to the primary vehicle.

15. A system according to claim 1 wherein the IVU includes tamper-evident seals facilitating ready detection of unauthorised attempts to remove or access an IVU associated with a vehicle.

16. A system according to claim 1 wherein the one or more vehicle-use conditions is selected from the group comprising an off the shelf condition and a unique condition.

17. The system according to claim 1 wherein for each record in the time-marked log, the comparison includes the SP processor:

(i) identifying, based on the one or more use conditions defined in the datafile, those conditions which are relevant to the record;

(ii) arranging the relevant conditions into an order of precedence; and (iii) comparing the data in the record with the relevant conditions as ordered and assessing whether the vehicle is compliant;

wherein the order of precedence for a spatial access condition is: absolute inclusion; exclusion; inclusion; background.

18. A system according to claim 1 wherein the SP processing apparatus is adapted to receive self declaration input without use of a Self Declaration Input Device coupled to the IVU.

19. A system according to claim 1 wherein the one or more vehicle-use conditions comprise spatial conditions having the following order of precedence for the purpose of determining non-compliance: absolute-inclusion; exclusion; inclusion; background.

20. A system according to claim 1 wherein the one or more vehicle-use conditions define a vehicle's permission to access the transport network.

21. A system according to claim 1 wherein the datafile is completed in an electronic application process, whereby:

(a) an applicant associated with a vehicle elects one or more desired conditions of vehicle use in an electronic application;

(b) the electronic application is transmitted via electronic transmission means to a third party for approval;

(c) if the electronic application is approved, the third party appends approval data to the datafile, giving the applicant temporary permission to access the transport network in accordance with the elected conditions, conditional upon, in a prescribed time frame:

(i) monitoring hardware being installed in the associated vehicle; and using a monitoring service to monitor use of the associated vehicle; and (d) when the third party is notified that the hardware has been installed and the monitoring service commenced, the datafile is finalised for continued permission to access the transport network.

* * * * *